(12) United States Patent
Yoshii

(10) Patent No.: US 7,561,230 B2
(45) Date of Patent: Jul. 14, 2009

(54) ELECTRO-OPTICAL DEVICE, WIRING BOARD, AND ELECTRONIC APPARATUS

(75) Inventor: Masahito Yoshii, Fujimi-cho (JP)

(73) Assignee: Seiko Epson Corporation, Tokyo (JP)

(*) Notice: Subject to any disclaimer, the term of this patent is extended or adjusted under 35 U.S.C. 154(b) by 274 days.

(21) Appl. No.: 11/500,668

(22) Filed: Aug. 8, 2006

(65) Prior Publication Data

US 2007/0035683 A1    Feb. 15, 2007

(30) Foreign Application Priority Data

Aug. 11, 2005    (JP)    ............................. 2005-232866
Jun. 6, 2006    (JP)    ............................. 2006-157015

(51) Int. Cl.
       *G02F 1/1333*    (2006.01)
(52) U.S. Cl. ..................... 349/110; 349/149
(58) Field of Classification Search ............. 349/56, 349/84, 104, 110, 111, 113, 114, 122
See application file for complete search history.

(56) References Cited

U.S. PATENT DOCUMENTS

| | | | | |
|---|---|---|---|---|
| 4,277,143 A * | 7/1981 | Pauli et al. | ................. | 349/190 |
| 4,774,143 A * | 9/1988 | Gondela et al. | ............ | 428/442 |
| 5,011,732 A * | 4/1991 | Takeuchi et al. | ........... | 428/209 |
| 5,229,642 A * | 7/1993 | Hara et al. | ................. | 257/691 |
| 5,278,009 A * | 1/1994 | Iida et al. | ...................... | 430/7 |
| 5,521,728 A * | 5/1996 | Kodate et al. | ................ | 349/42 |
| 5,751,065 A * | 5/1998 | Chittipeddi et al. | ........ | 257/758 |
| 5,879,974 A * | 3/1999 | Yamazaki | ................... | 438/162 |
| 5,914,763 A * | 6/1999 | Fujii et al. | ................ | 349/149 |
| 5,929,501 A * | 7/1999 | Shin et al. | ................ | 257/448 |
| 5,933,209 A * | 8/1999 | Yonemoto | ................... | 349/153 |
| 5,952,708 A * | 9/1999 | Yamazaki | ................... | 257/643 |
| 6,001,461 A * | 12/1999 | Toyoda et al. | .............. | 428/210 |
| 6,011,608 A * | 1/2000 | Tanaka | ....................... | 349/153 |
| 6,040,200 A * | 3/2000 | Hayashi et al. | ............... | 438/30 |
| 6,100,589 A * | 8/2000 | Tanaka | ....................... | 257/758 |
| 6,313,540 B1 * | 11/2001 | Kida et al. | .................. | 257/784 |
| 6,330,044 B1 * | 12/2001 | Murade | ....................... | 349/44 |
| 6,404,473 B1 * | 6/2002 | Kaneko et al. | ............. | 349/139 |
| 6,426,245 B1 * | 7/2002 | Kawasaki et al. | ........... | 438/166 |
| 6,463,977 B1 * | 10/2002 | Youn | .......................... | 349/154 |
| 6,468,884 B2 * | 10/2002 | Miyake et al. | ............. | 438/481 |

(Continued)

FOREIGN PATENT DOCUMENTS

JP            11212048 A *    8/1999

(Continued)

*Primary Examiner*—Frank G Font
*Assistant Examiner*—Peter Radkowski
(74) *Attorney, Agent, or Firm*—AdvantEdge Law Group, LLC

(57) ABSTRACT

An electro-optical device includes a substrate; a plurality of pixels that are formed in an image display region on the substrate; a plurality of light-shielding films that are formed as island shapes in peripheral regions around the image display region; separation regions that extend in a first direction between the plurality of light-shielding films; an insulating film that covers the plurality of light-shielding films and the separation regions; and a plurality of first conductive films that are formed so as to extend in the first direction and disposed in a direction crossing the first direction, on the insulating film. Further, the plurality of first conductive films overlap the separation regions that extend between the plurality of light-shielding films.

11 Claims, 10 Drawing Sheets

U.S. PATENT DOCUMENTS

| | | | |
|---|---|---|---|
| 6,551,916 B2* | 4/2003 | Lin et al. | 438/612 |
| 6,636,284 B2* | 10/2003 | Sato | 349/110 |
| 6,665,040 B2* | 12/2003 | Youn | 349/153 |
| 6,710,843 B2* | 3/2004 | Choo et al. | 349/187 |
| 6,720,120 B2* | 4/2004 | Uda et al. | 430/20 |
| 6,815,070 B1* | 11/2004 | Burkle et al. | 428/425.6 |
| 6,861,136 B2* | 3/2005 | Verlinden et al. | 428/332 |
| 6,876,064 B2* | 4/2005 | Matumoto et al. | 257/632 |
| 6,879,015 B2* | 4/2005 | Liang et al. | 257/459 |
| 6,982,777 B2* | 1/2006 | Lai et al. | 349/153 |
| 7,023,067 B2* | 4/2006 | Allman et al. | 257/459 |
| 7,023,090 B2* | 4/2006 | Huang et al. | 257/756 |
| 7,052,825 B2* | 5/2006 | Uda et al. | 430/322 |
| 7,074,631 B2* | 7/2006 | Erchak et al. | 438/22 |
| 7,105,861 B2* | 9/2006 | Erchak et al. | 257/99 |
| 7,151,585 B2* | 12/2006 | Asakawa | 349/153 |
| 7,182,877 B2* | 2/2007 | Murai et al. | 216/24 |
| 7,190,422 B2* | 3/2007 | Mochizuki | 349/44 |
| 7,199,042 B2* | 4/2007 | Ozawa | 438/624 |
| 7,221,026 B2* | 5/2007 | Bhattacharyya | 257/350 |
| 7,294,566 B2* | 11/2007 | Moriya et al. | 438/617 |
| 7,298,051 B2* | 11/2007 | Saito | 257/784 |
| 2002/0018278 A1* | 2/2002 | Sato | 359/245 |
| 2002/0051106 A1* | 5/2002 | Nagashima et al. | 349/110 |
| 2002/0146874 A1* | 10/2002 | Kawasaki et al. | 438/166 |
| 2002/0149734 A1* | 10/2002 | Melnik et al. | 349/156 |
| 2002/0187575 A1* | 12/2002 | Maruyama et al. | 438/33 |
| 2003/0096106 A1* | 5/2003 | Verlinden et al. | 428/332 |
| 2003/0223030 A1* | 12/2003 | Byun et al. | 349/187 |
| 2004/0126941 A1* | 7/2004 | Yukawa | 438/160 |
| 2004/0150766 A1* | 8/2004 | Choo et al. | 349/73 |
| 2004/0218111 A1* | 11/2004 | Mochizuki | 349/44 |
| 2005/0059179 A1* | 3/2005 | Erchak et al. | 438/22 |
| 2005/0115889 A1* | 6/2005 | Schaevitz et al. | 210/490 |
| 2005/0219456 A1* | 10/2005 | Tadaki et al. | 349/156 |
| 2005/0253150 A1* | 11/2005 | Motoshima et al. | 257/72 |
| 2005/0263903 A1* | 12/2005 | Forbes et al. | 257/763 |
| 2005/0281995 A1* | 12/2005 | Murai et al. | 428/209 |
| 2006/0110908 A1* | 5/2006 | Moriya et al. | 438/617 |
| 2007/0164275 A1* | 7/2007 | Ishiguro | 257/40 |
| 2007/0173031 A1* | 7/2007 | Kodaira et al. | 438/400 |
| 2007/0286975 A1* | 12/2007 | Fazel et al. | 428/41.8 |
| 2008/0018243 A1* | 1/2008 | Ishiguro et al. | 313/506 |
| 2008/0036705 A1* | 2/2008 | Iwashita et al. | 345/76 |
| 2008/0102387 A1* | 5/2008 | Yukiko | 430/20 |

FOREIGN PATENT DOCUMENTS

JP    A-2003-177427    6/2003

* cited by examiner

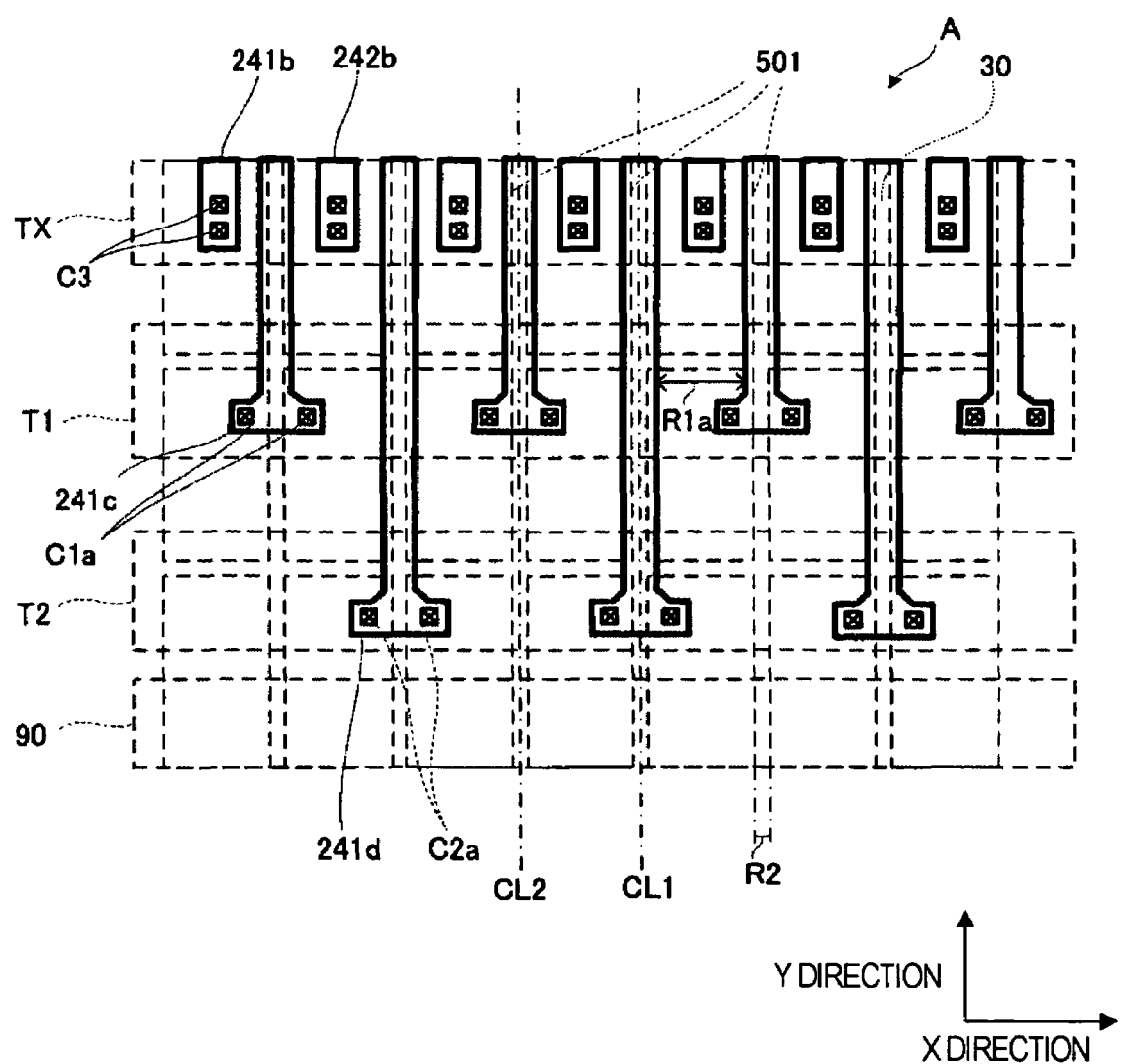

ELECTRO-OPTICAL DEVICE, WIRING BOARD, AND ELECTRONIC APPARATUS

BACKGROUND

1. Technical Field

The present invention relates to an electro-optical device, such as a liquid crystal device and the like. More particularly, the prevent invention relates to an electro-optical device having a frame-shaped light-shielding film that defines an image display region, and to an electronic apparatus including the electro-optical device.

2. Related Art

In general, an electro-optical device includes an element array substrate in which display electrodes, such as pixel electrodes or striped electrodes, various wiring lines, such as data lines or scanning lines, and switching elements, such as thin film transistors for pixel switching (hereinafter, referred to as TFTs) or thin film diodes (hereinafter, referred to as TFDs) are formed, and a counter substrate in which a counter electrode formed in stripes or over an entire surface of the counter substrate, light-shielding films, and the like are formed. The element array substrate is opposite to the counter substrate. Further, an electro-optical material, such as liquid crystal, is surrounded by a sealant between the element array substrate and the counter substrate. In a region (that is, a region on the substrate that faces the liquid crystal or the like) closer to the center than the sealing region where the sealant is provided, an image display region where pixel electrodes are disposed is formed. In particular, a frame region of the image display region is defined by the same film as a light-shielding film provided on the counter substrate in a frame shape along an inside contour of the sealing region in plan view (that is, when viewed from a direction opposite to the image display region).

In the peripheral regions around the image display region, peripheral circuits, such as a scanning line driving circuit, a data line driving circuit, a sampling circuit, a test circuit, and the like, are provided on the element array substrate. That is, a so-called peripheral circuit built-in electro-optical device has been widely used. Accordingly, in the peripheral regions, wiring lines that are led from the image display region to the peripheral regions are generally provided.

In such an electro-optical device, a pattern portion, which has wiring lines or circuit elements existing in the frame region on the element array substrate, is formed of a conductive film, such as a patterned Al film or the like. For example, in an electro-optical device for a projector where the intensity of incident light is strong and a large number of oblique components are held, the incident light is reflected on a surface of the pattern portion according to the reflectance of the pattern portion, and passes though the interference of the pattern portion. As such, the light reflected from the pattern portion is reflected on a frame-shaped light-shielding film made of a material, such as chromium (Cr), on the counter substrate.

The inner surface reflecting light reflected from the frame-shaped light-shielding film or light having passed through the pattern portion includes reflective light reflected from a rear surface of the element array substrate; inner surface reflecting light reflected from the frame-shaped light-shielding film; light having passed through the pattern portion; reflective light reflected from optical elements, such as a polarizing plate, a phase difference plate, a dust-proof glass, and the like, mounted on a light emission side of the electro-optical device; returned light that is emitted from another electro-optical device and passes through a synthetic optical system to be then returned, in a case of constructing a multiple-plate-type projector by combining a plurality of electro-optical devices as light valves; and inner surface reflecting light reflected from the pattern portion or the frame-shaped light-shielding film. The above-mentioned reflected light is combined in finally emitted light to be then emitted from the electro-optical device.

As a result, bright and dark patterns according to the reflection or transmission in the pattern portion (for example, when a plurality of wiring lines are disposed, bright and dark striped patterns) may be shown near the edges of display images. In order to solve the above-mentioned problem, JP-A-2003-177427 discloses an electro-optical device in which lower light-shielding films are formed in a portion of a frame region on an element array substrate.

However, in this electro-optical device, when the electro-optical device is manufactured or driven, cracks may occur in regions separating lower light-shielding films from one another. The cracks propagate to a multilayered structure on an element array substrate along the edges of the lower light-shielding films and the corner portions in plan view, which cuts the wiring lines formed on the lower light-shielding films. Accordingly, due to the propagation of the cracks, when the electro-optical device is manufactured, the yield may be lowered, or reliability of the electro-optical device may be lowered. Specifically, when the power supply wiring lines are cut due to the propagation of the cracks, it becomes difficult to drive the electro-optical device. According to a technology disclosed in JP-A-2003-177427, in order to prevent the defects in the display images, the lower light-shielding films are formed on the element array substrate. Further, in JP-A-2003-177427, a multilayered structure how not to generate the propagating of cracks to the element array substrate is not described. In addition, in JP-A-2003-177427, the description is not made with respect to the possibility that defects may occur when the wring lines are cut due to the propagation of the cracks.

SUMMARY

An advantage of some aspects of the invention is that it provides an electro-optical device, in which cracks can be reduced from being generated in a multilayered structure on an element array substrate, and even if the cracks are generated, the cracks can be prevented from propagating, a wiring line device, and an electronic apparatus.

According to an aspect of the invention, an electro-optical device includes a substrate; a plurality of pixels that are formed in an image display region on the substrate; a plurality of light-shielding films that are formed as island shapes in peripheral regions around the image display region; separation regions that extend in a first direction between the plurality of light-shielding films; an insulating film that covers the plurality of light-shielding films and the separation regions; and a plurality of first conductive films that are formed so as to extend in the first direction and disposed in a direction crossing the first direction, on the insulating film. Further, the plurality of first conductive films overlap the separation regions that extend between the plurality of light-shielding films.

Preferably, each of the plurality of light-shielding films corresponds to a lower light-shielding film that is formed below a circuit provided in the peripheral region.

In the electro-optical device according to the first aspect of the invention, it is possible to reduce the cracks occurring in the separation portions from propagating through the insulating film covering the separation regions and the lower light-shielding films. Accordingly, it is possible to reduce the amount of damage to the multilayered structure formed on the insulating film due to the propagation of the cracks. In addition, as described below, it is possible to reduce the occurrence of the cracks at various layers of the substrate by the layout of the plurality of lower light-shielding films and the plurality of first conductive films on the substrate.

The lower light-shielding film is provided to reduce bright and dark striped patterns generated in the display images due to inner surface reflecting light reflected from the frame-shaped light-shielding film. The lower light-shielding film is directly or indirectly formed on the substrate in the peripheral regions that extend around the image display region.

A portion of the insulating film is provided in the separation region that extends along one side of the lower light-shielding film among the regions separating the plurality of lower light-shielding films from one another. For example, when the insulating film covering the plurality of lower light-shielding films is formed, a portion of the insulating material forming the insulating film is cured in the separation region.

In this case, when the width of the separation region is less than 1 μm, the insulating materials are uniformly contained in the separation regions, and the top surface of a portion of the insulating film that extends in the separation region is flat. Accordingly, a hollow as one factor that causes the cracks to occur is not formed in the separation portion. Further, when the width of the separation region is not less than 6 μm, the top surface of the insulating film that extends in the separation region is sufficiently inclined such the cracks do not occur. As a result, it is difficult for the cracks to occur in the separation region. Furthermore, when the width of the separation region is within a range of 3 to 5 μm, a hollow may easily occur on the top surface of the separation region from an experimental viewpoint or a logical viewpoint, which may cause the cracks to occur. Therefore, as described below, when the width of the separation region is within a range of 3 to 5 μm, it is possible to effectively reduce the occurrence and propagation of the cracks by the positional relationship between the first conductive film and the lower light-shielding films. It should be understood that the width of the separation region in which the cracks may easily occur is only one example, and the hollow occurring in the separation region may vary by the insulating material forming the insulating film and the manufacturing conditions.

The plurality of first conductive films are formed so as to extend along one side on the insulating film, and they are disposed in the direction crossing one side, in plan view, such that the separation regions separating the plurality of first conductive films do not overlap the separation region. Since the regions separating the plurality of first conductive films from one another do not overlap the separation regions in plan view, it is possible to reduce the cracks from propagating over one side of the lower light-shielding film from the separation portion when the electro-optical device is manufactured or driven and the regions separating the plurality of first conductive films. Specifically, as compared to the lower light-shielding film made of a metal, such as, for example, aluminum or chromium, and the first conductive film formed of a semiconductor film, it is possible to suppress the occurrence and propagation of the cracks occurring due to the overlapping of portions whose mechanical strength is lowered.

In the electro-optical device according to the first aspect of the invention, the occurrence and propagation of the cracks can be reduced. Thus, it is possible to reduce the layers formed on the plurality of first conductive films from being cut due to the cracks. Thereby, the defects occurring when the electro-optical device is manufactured can be reduced, and thus the yield can be improved. In addition, the defects occurring when the electro-optical device is driven can be reduced, and thus it is possible to achieve an electro-optical device having superior reliability.

Preferably, the electro-optical device according to the first aspect of the invention further includes a plurality of second conductive films that are formed on the plurality of first conductive films, at least partially overlap the separation regions extending in the first direction in the regions between the lower light-shielding films, and extend in a direction crossing the first direction.

According to this configuration, it is possible to reduce the second conductive film from being cut due to the propagation of the cracks. Since the second conductive film extends along a direction crossing the one side so as to partially overlap the separation region, when the cracks propagate along the one side of the lower light-shielding film, the second conductive film may be cut. Accordingly, the cracks are made not to propagate along the one side, and thus the second conductive film can be reduced from being cut.

In this case, the 'second conductive film' corresponds to a metallic film made of a metallic material, such as aluminum and the like. Specifically, the second conductive films correspond to power supply wiring lines that supply the driving power supply so as to drive various circuits included in the electro-optical device. The power supply lines are reduced from being cut, and it is thus possible to normally operate various circuits included in the electro-optical device.

Preferably, the plurality of lower light-shielding films are disposed in a matrix in the peripheral region, and the plurality of first conductive films are disposed at predetermined intervals corresponding to intervals between the plurality of lower light-shielding films in the direction crossing the one side.

According to this configuration, as compared with a case in which the lower light-shielding film is formed as one lower light-shielding film in the peripheral region, the plurality of lower light-shielding films are disposed in a matrix, the stresses applied to an upper layer and a lower layers of the lower light-shielding film can be alleviated, and the occurrence and the propagation of the cracks can be reduced. Specifically, when the lower light-shielding film is formed in the peripheral region as one light-shielding film, in the edge region of the peripheral region, stresses applied between the lower light-shielding film and the upper layer and the lower layer of the lower light-shielding film are increased, and the cracks may easily occur and propagate. Accordingly, the plurality of lower light-shielding film are disposed in a matrix, and thus stresses can be alleviated and the returned light can be reduced.

In addition, the regions separating the plurality of lower light-shielding films are set to be narrower to the extent that the exit light in the image display region through the regions separating the plurality of lower light-shielding films rarely affects the display image. In this case, the occurrence and propagation of the cracks can be reduced while maintaining the quality of the display image. Further, since the plurality of first conductive films are disposed at predetermined intervals corresponding to intervals between the plurality of lower light-shielding film in the directions crossing the one side, the stresses applied between the plurality of first conductive films and the plurality of lower light-shielding films can be reduced.

Preferably, planar shapes of the first conductive films are symmetrical on the basis of the separation regions in the direction crossing the first direction.

According to this configuration, when the first conductive film is formed on the insulating film by using a thin film forming method, such as a deposition method or a sputtering method, the stresses applied from the first conductive film to the insulating film can be reduced, and thus the stresses that are indirectly applied to the separation portion can be reduced. Accordingly, the cracks occurring in the separation region can be reduced, which can suppress the cracks that may easily propagate due to the stresses applied to the lower layer side of the first conductive film.

Preferably, the electro-optical device further includes a plurality of third conductive films that are formed on different layers from the plurality of first conductive films, that extend in a direction crossing the first direction, and that are disposed in the first direction. Further, lengths of one first conductive film and another first conductive film, adjacent to each other, among the plurality of first conductive films are different from each other in the first direction, the one first conductive film is electrically connected to one of the plurality of third conductive films by one conductive portion that extends in a direction crossing a surface of the substrate, and another first conductive film is electrically connected to one of the plurality of third conductive films by another conductive portion that extends in the direction crossing the surface of the substrate.

According to this configuration, one first conductive film and another first conductive film can be electrically connected to the plurality of third conductive films without forming the multilayered structure that includes the conductive films and the insulating layer formed on the substrate with a complicated layer structure.

According to this configuration, one first conductive film and another first conductive film are adjacent to each other along the one side, and different from each other in length along the one side. Specifically, the first conductive film extending in a direction crossing the one side and another first conductive film whose length along the one side is shorter or longer than that of the first conductive film are disposed in the peripheral region.

The plurality of first conductive films including the one first conductive film and another first conductive film are electrically connected to the plurality of third conductive films that are formed on the layer different from the plurality of first conductive films through one conductive portion being a contact hole and another conductive portion.

Preferably, the electro-optical device according to the first aspect of the invention further includes a plurality of transistors that are electrically connected to the plurality of pixels, each of which has a pixel electrode. Further, the one first conductive film is electrically connected to a gate of one transistor among adjacent transistors in the first direction in the plurality of transistors, and another first conductive film is electrically connected to a gate of another transistor among the adjacent transistors.

According to this configuration, the third conductive film to which the first conductive film is electrically connected corresponds to a wiring line that supplies a switching signal for switching one transistor. In addition, another third conductive film can supply a switching signal to another transistor.

According to this configuration, the test signal that contains information for determining whether there are defects in the plurality of pixel portions can be output to the test circuit provided in the peripheral region through the transmission gate including the plurality of transistors.

Preferably, the electro-optical device according to the first aspect of the invention further includes a counter substrate that is opposite to the substrate and bonded to the substrate by a sealant provided in an outside region of a frame region defining the image display region in the peripheral regions. Further, the counter substrate has upper light-shielding films that are formed in the frame region at a counter surface side opposite to the substrate surface, and the lower light-shielding films are formed in at least the outside region of the peripheral region.

According to this configuration, the returned light that is combined in the emitted light from the image display region as the final image display light can be reduced, and it is thus possible to suppress occurrence of the bright and dark striped patterns shown near the edge of the image display region. Accordingly, it is possible to reduce the display defect that cannot be suppressed by only the upper light-shielding film.

According to a second aspect of the invention, a wiring substrate includes a substrate; a plurality of conductive films that are formed as island shapes on the substrate; separation regions that extend in a first direction between the plurality of conductive films; an insulating film that covers the plurality of conductive films and the separation regions; and a plurality of wiring lines that are formed so as to extend in the first direction and disposed in a direction crossing the first direction, on the insulating film. Further, the plurality of wiring lines overlap the separation regions that extend between the plurality of conductive films.

In the wiring board according to the second aspect of the invention, similar to the electro-optical device according to the first aspect of the invention, the occurrence and propagation of the cracks can be reduced. For example, it is possible to reduce the layer formed on the plurality of conductive films from being cut due to the cracks.

According to a third aspect of the invention, there is provided an electronic apparatus including the electro-optical device.

The electronic apparatus according to the third aspect of the invention includes the above-mentioned electro-optical device. Therefore, it is possible to achieve various electronic apparatuses, such as a projection display device, a cellular phone, an electronic note, a word processor, a view-finder-type or monitor-direct-view video tape recorder, a workstation, a video phone, a POS terminal, and a touch panel, in which high resolution display can be made. Further, as another example of the electronic apparatus, an electrophoresis device, such as an electronic paper and the like, can be achieved.

The advantages and other effects can be apparent from the following preferred embodiments.

BRIEF DESCRIPTION OF THE DRAWINGS

The invention will be described with reference to the accompanying drawings, wherein like numbers reference like elements.

FIG. 10 is a plan view illustrating a portion of a first layer of a TFT array substrate 10 according to a modification.

DESCRIPTION OF EXEMPLARY EMBODIMENTS

Hereinafter, an electro-optical device, a wiring board, and an electronic apparatus according to the preferred embodiment of the invention will be described with reference to the accompanying drawings. In this embodiment, a TFT-active-matrix driving-type liquid crystal device 1 having built-in driving circuits will be exemplified as an example of an electro-optical device.

Figure 1:
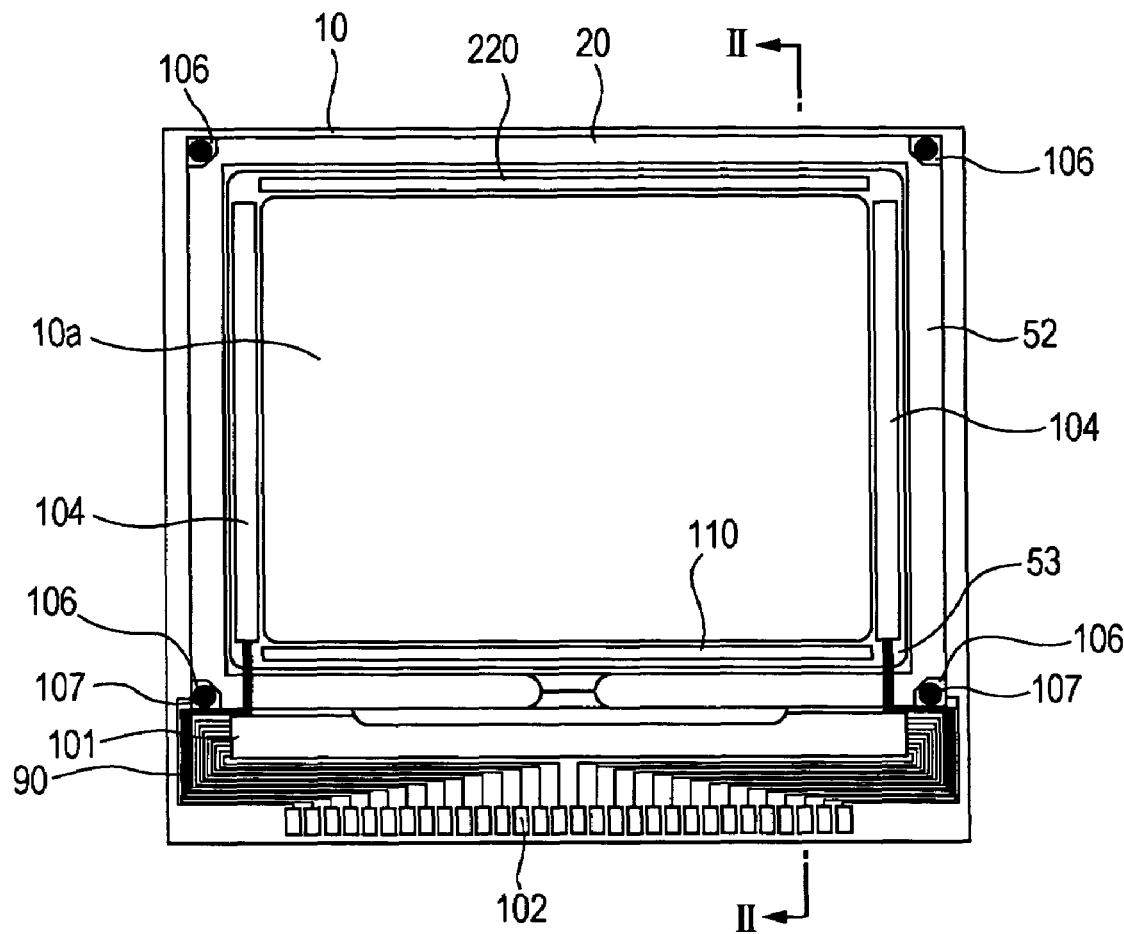
FIG. 1 is a plan view illustrating an entire structure of a liquid crystal device.
Figure 2:
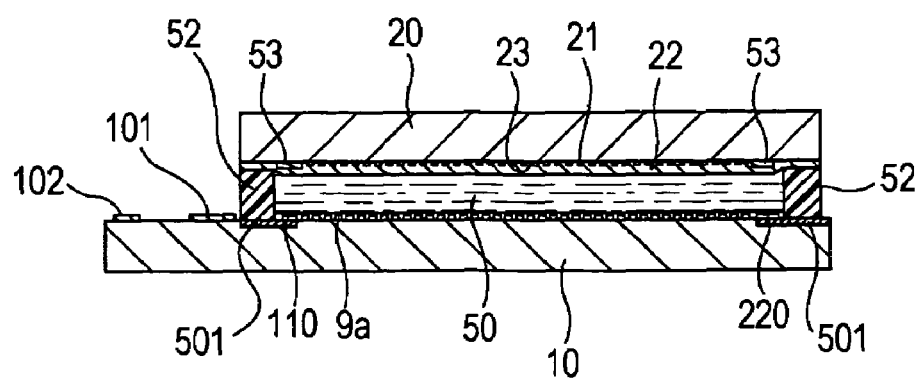
FIG. 2 is a cross-sectional view taken along the line II-II of FIG. 1.

FIG. 1 is a plan view illustrating a TFT array substrate and various essential elements formed on the TFT array substrate when viewed from a counter substrate side. FIG. 2 is a cross-sectional view taken along the line II-II of FIG. 1.

In FIGS. 1 and 2, a liquid crystal device 1 includes a TFT array substrate 10, and a counter substrate 20 that is opposite to the TFT array substrate 10.

The counter substrate 20 is bonded to the TFT array substrate 10 by a sealant 52 provided in a peripheral region that extends to peripheral portions of an image display region 10a. A liquid crystal layer 50 is interposed between the TFT array substrate 10 and the counter substrate 20. The counter substrate 20 is bonded to the TFT array substrate 10 by the sealant 52 that is disposed outside a frame region at the side of a surface opposite to the TFT array substrate 10, which will be described in detail below. The sealant 52 that bonds the TFT array substrate 10 and the counter substrate 20 to each other is made of resin materials, such as, for example, an ultraviolet curable resin, a thermosetting resin, and the like, which are applied on the TFT array substrate 10 and then cured by ultraviolet ray irradiation or heating in manufacturing processes. In addition, a gap material made of a material, such as glass fiber or glass bead are dispersed in the sealant 52 to maintain the gap between the TFT array substrate 10 and the counter substrate 20 (the gap between the substrates) at a predetermined interval. Therefore, the electro-optical device 1 according to this embodiment is used for a light value of a projector as a small-sized device and suitable for enlarging and displaying images. However, if the liquid crystal device 1 is a liquid crystal device, such as a liquid crystal display or a liquid crystal television as a large-sized device in which images are displayed at the same magnification, the gap material may be included in the liquid crystal layer 50.

The counter substrate 20 has frame-shaped light-shielding films 53 having a light shielding property, as an example of an 'upper light-shielding film' of the invention, each of which is provided in a frame region defining the image display region 10a. The frame-shaped light-shielding film 53 is formed in the frame region that extends parallel to the inside of the sealing region where the sealant 52 is disposed. However, a portion or all of the frame-shaped light-shielding film may be provided as a light-shielding film at the TFT array substrate 10 side.

The TFT array substrate 10 has lower light-shielding films 501 that are formed over a region ranging from the frame region to an outside region of the frame region. The lower light-shielding film 501 is partially formed outside the frame-shaped light-shielding film 53 that is provided over a region ranging from the outer circumference of the image display region 10a to the peripheral side. In the frame region and the outside region of the frame region, the lower light-shielding film 501 is formed below wiring lines that are led from data lines (which will be described in detail below) through circuit elements, such as TFTs, wiring lines that supply switching signals for turning on or off the TFTs forming a transmission gate, and power supply wiring lines that drive various circuits included in the liquid crystal device 1. In the peripheral regions of the image display region 10a, the lower light-shielding film 501 reduces reflective light that is reflected from various wiring lines and the like, and transmissive light that transmits gaps between various wiring lines. Thereby, the amounts of reflective light and transmissive light finally combined in finally emitted light for display are notably reduced by an amount of light absorbed or reflected from the lower light-shielding film 501. Accordingly, the liquid crystal device 1 can reduce returned light combined in emitted light that is finally emitted from the image display region 10a as image display light, and thus it is possible to suppress the occurrence of bright and dark striped patterns shown near the edge of the image display region 10a. That is, the liquid crystal device 1 can reduce display defects that cannot be suppressed by only the upper light-shielding film.

Among regions enlarged around the image display region 10a, in the peripheral regions located outside the shielding region in which the sealant 52 is disposed, a data line driving circuit 101 and external circuit connecting terminals 102 are provided along one side of the TFT array substrate 10, and scanning line driving circuits 104 are provided along two sides adjacent to the one side. Further, a plurality of wiring lines 105 are provided at a remaining side of the TFT array substrate 10 so as to connect the scanning line driving circuits 104 that are provided at both sides of the image display region 10a. As shown in FIG. 1, upper and lower conductive members 106 that serve as upper and lower conductive terminals between the two substrates are provided at four corners of the counter substrate 20. Meanwhile, in the TFT array substrate 10, upper and lower conductive terminals are provided in regions opposite to the corners. Thereby, the TFT array substrate 10 and the counter substrate 20 can be electrically connected to each other.

A sampling circuit 110 that samples image signals supplied from the data line driving circuit 101 is disposed in a frame region that is formed by the frame-shaped light-shielding films 53. That is, circuit elements, such as TFTs and the like, which form the sampling circuit 110, are disposed in the frame region. Further, various wiring line portions that include a wiring line portion ranging from the data lines provided in the image display region 10a to the sampling circuit 110, a wiring line portion ranging from the data line driving circuit 101 to the sampling circuit 110, and a wiring line portion ranging from scanning lines provided in the image display region 10a to the scanning line driving circuit 104 are formed in the frame region or outside the frame region.

In FIG. 2, after pixel switching TFTs or wiring lines, such as the scanning lines and the data lines, are formed on the TFT array substrate 10, an alignment film is formed on pixel electrodes 9a. Meanwhile, on the counter substrate 20, the counter electrode 21 is formed, and an alignment film is formed on the uppermost layer on the counter substrate. Further, the liquid crystal layer 50 is made of liquid crystal in which a kind or more of nematic liquid crystal is combined. A predetermined alignment state is maintained between the pair of alignment films.

Further, on the TFT array substrate 10 shown in FIGS. 1 and 2, in addition to the data line driving circuit 101, the scanning line driving circuits 104, and the sampling circuit 110, a precharge circuit that supplies precharge signals of predetermined voltage levels to the plurality of data lines before supplying the image signals, a test circuit that tests the quality or defect of the electro-optical device during the manufacturing process of the liquid crystal device 1 or at the time of shipment of the liquid crystal device 1, and the like may be formed.

Figure 3:
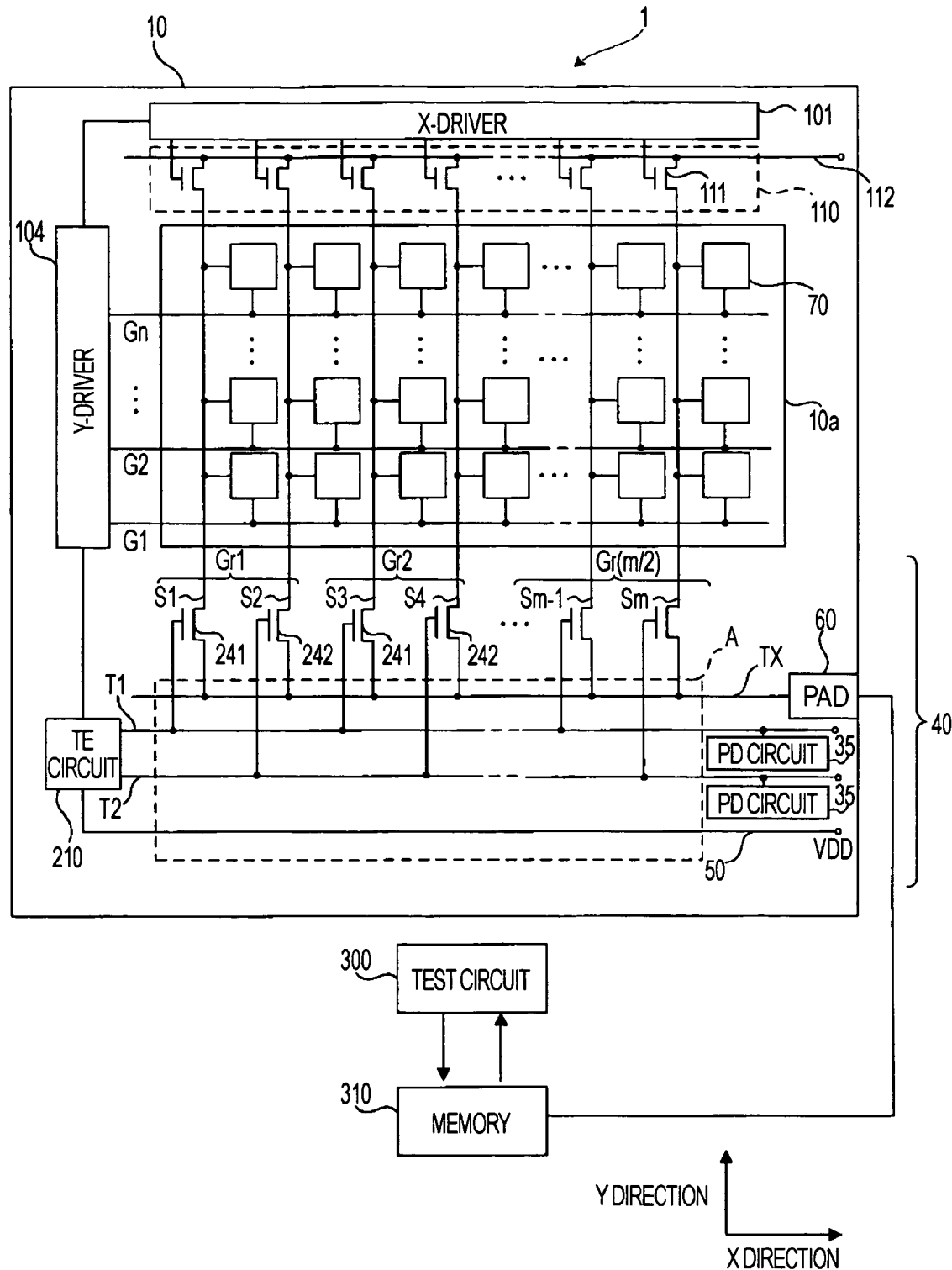
FIG. 3 is a circuit diagram illustrating a main circuit structure of a TFT array substrate 10.

Next, a main circuit configuration of the TFT array substrate 10 will be described with reference to FIG. 3. FIG. 3 is a circuit diagram illustrating the main circuit configuration of the TFT array substrate 10. The TFT array substrate 10 is an application example of the wiring board of the invention. FIG. 3 is a circuit diagram illustrating a state in which the plan view shown in FIG. 1 is inverted.

In FIG. 3, the liquid crystal device 1 includes a plurality of scanning lines Gj (j=1, 2, . . . , and n), a plurality of data lines Si (i=1, 2, . . . , and m), a Y-driver circuit 104, an X-driver circuit 101, a sampling circuit 110, a plurality of pixel portions 70, a test circuit 40, and power supply wiring lines 90 which is an example of a 'second conductive film' of the invention, all of which are provided on the TFT array substrate 10.

The plurality of scanning lines Gj and the plurality of data lines Si are disposed so as to cross one another in the image display region 10a.

The Y driver circuit 104 sequentially supplies switching signals to the scanning lines at the time of testing the pixel portions 70. In this case, the switching signals are different from scanning signals for image display that are supplied to the pixel portions 70 when the images are displayed, and correspond to signals for turning on the TFTs included in the pixel portions 70 in order to make test output signals (which will be described in detail below) to be outputted from the pixel portions 70.

The X-driver circuit 101 supplies sampling signals to sampling switches 111 forming the sampling circuit 110 so as to turn on the sampling switches 111. In this case, the 'sampling signal' is supplied from the X-driver circuit 101 to the sampling circuit 110, such that when the test is performed, refresh signals and signals determining whether defects occur in the pixel portions are supplied to the data lines Si through the image signal lines 112.

The sampling circuit 110 includes a plurality of sampling switches 111, each of which is turned on or off in accordance with a sampling signal supplied from the X-driver circuit 101.

Each of the pixel portions 70 has the pixel electrode 9a shown in FIG. 2, the TFT that is turned on or off by the switching signal supplied from the Y-driver circuit 104, and a storage capacitor that temporarily holds an image signal supplied to the pixel portion 70 when image display is performed and enables active matrix driving of the plurality of pixel portions 70.

The test circuit 40 has test enable switches 241 and 242, a test enable (hereinafter, also referred to as TE) circuit 210, pull-down (hereinafter, also referred to as PD) circuits 35, leading wiring lines 241a and 242a as an example of 'a first conductive film' of the invention, test enable wiring lines T1 and T2, and a PAD 60.

In FIGS. 1 and 2, the PAD 60 may be constructed as one of the external circuit connecting terminals 102, and may be provided as an exclusive pad that is separated from the external circuit connecting terminals 102.

The test enable switches 241 and 242 are provided in a peripheral region of the image display region 10a on the substrate surface of the TFT array substrate. The test enable switches 241 and 242 are provided so as to correspond to the two data lines that form a data line group Grk, and turned on according to the test enable signals supplied from the test enable circuit 210, which will be described in detail below. The test enable switches 241 and 242 are turned on, and thus a test subject signal from each pixel portion 70 through the data line Si to be tested (which will be described below) for each data line group Grk is outputted to a test circuit 300 and a memory 310 through the PAD 60.

The test enable circuit 210 is electrically connected to gates of the test enable switches 241 and 242 through test enable wiring lines T1 and T2. The test enable wiring lines T1 and T2 are electrically connected to the gates of the test enable switches 241 and 242. When the test is performed, the test enable circuit 210 supplies the test enable signals to the test enable switches 241 and 242 through the test enable wiring lines T1 and T2, and the leading wiring lines 241a and 242a. Thereby, the test enable switches 241 and 242 are turned on or off, so that the test subjecting signals outputted from the pixel portions 70 are outputted to the test circuit 300 and the memory 310 through the leading wiring lines 241b and 242b, the test wiring line TX, and the PAD 60. The test circuit 300 determines whether the defects occur in the pixel portions 70 on the basis of the test signals that are primarily recorded in the memory 310 or the test signals that are directly supplied to the test circuit 300 through the memory 310.

The power supply wiring lines 90 are provided in the peripheral regions of the TFT array substrate 10 along the test enable wiring lines T1 and T2. The power supply wiring lines 90 supply a driving power supply VDD for driving the TE circuit 210, the X-driver circuit 101, the Y-driver circuit 104, and various circuits (not shown) formed on the TFT array substrate 10 to the respective circuits.

The pull-down circuits 35 stabilize the potentials of the test enable wiring lines T1 and T2, such that the test enable signals supplied to the test enable switches 241 and 242 through the test enable wiring lines T1 and T2 do not vary.

Further, the lower light-shielding films 501 are formed in the peripheral regions of the image display region 10a of the TFT array substrate 10. Specifically, in a region of the peripheral regions of the image display region 10a where the test circuit 40 is formed, the lower light-shielding films 501 are also formed below the switching elements forming the test circuit 40 or various elements, such as capacitors, or wiring lines.

Next, the test sequence of the pixel portion 70 will be described with reference to FIG. 3. The test of the pixel portion 70 is preferably performed in a step before a step of bonding the TFT array substrate 10 and the counter substrate 20 in the liquid crystal device 1.

In FIG. 3, when the test is performed, first, the test signal is supplied to the storage capacitor included in the pixel portion 70.

Next, a pixel switching TFT that is provided in each pixel portion 70 is turned off.

Next, refresh signals whose potential is 0 V are supplied to the data lines such that the potentials of the plurality of data lines Si become 0 V, and the plurality of data lines are refreshed. At this time, since the pixel switching TFT is turned off, the scanning signal that is supplied to the storage capacitor of the pixel portion 70 is held as it is.

Next, in each data line group Grk, in accordance with a test enable signal supplied from the test enable circuit 210, the test enable switch 241 or 242 is turned on or off, so that the test signal is outputted to the test wiring line 80 through a data line Si to be tested in the two data lines. In this embodiment, the test signals outputted from the pixel portions 70 are sequentially outputted according to an arrangement sequence of the data lines Si for each data line group Grk. Thereby, the test signals are supplied to the test circuit 300 and the memory 310 through the test wiring lines TX so as to test whether the defects exist in the pixel portions 70.

The above-mentioned test is performed for each scanning line Gj and each data line Si.

In the liquid crystal device according to this embodiment, even in the liquid crystal device having a liquid crystal panel, defective pixels can be easily discovered. In addition, in manufacturing processes, in a relatively initial step, it can be determined whether the defects exist in the pixel portions 70, that is, whether defects exist in the pixel portions. Therefore, a yield of the liquid crystal device can be improved, which result in decreasing the manufacturing cost.

Figure 4:
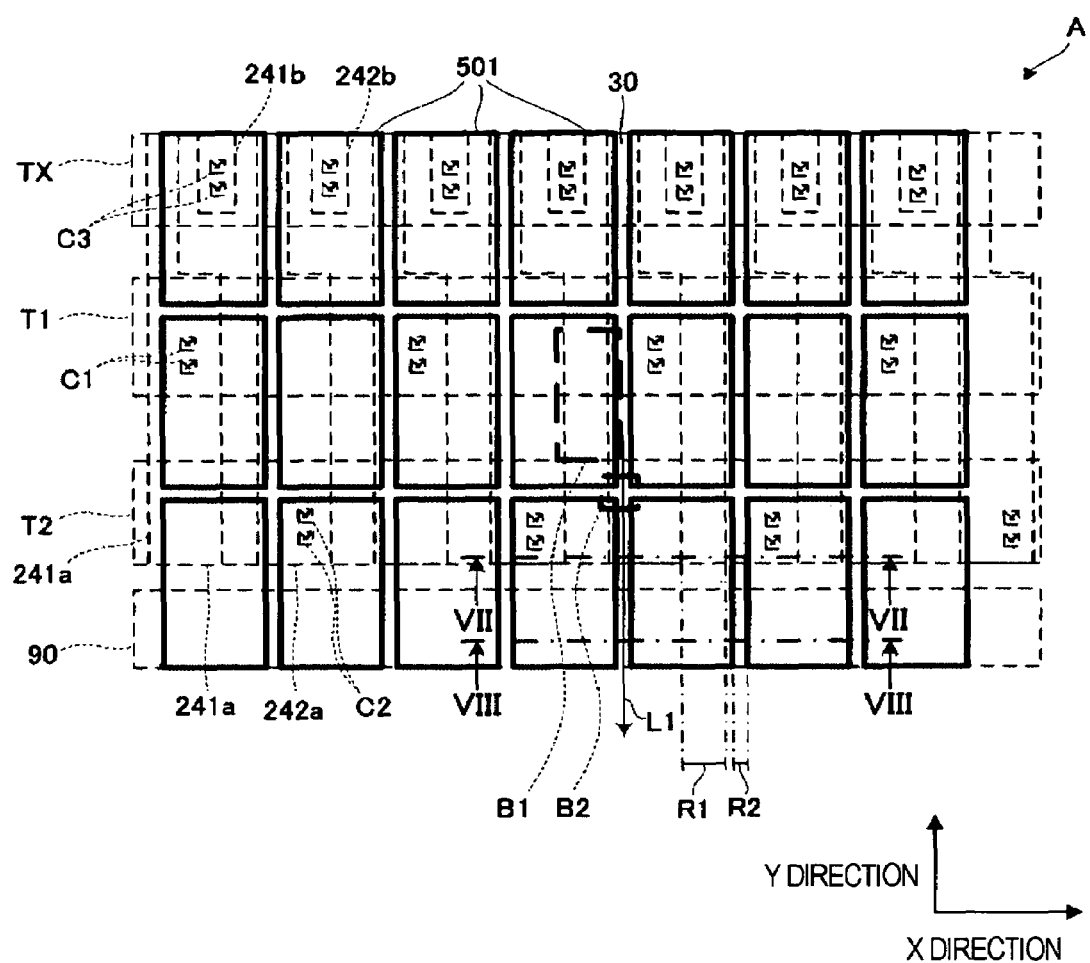
FIG. 4 is a plan view illustrating a first layer of a TFT array substrate 10.
Figure 5:
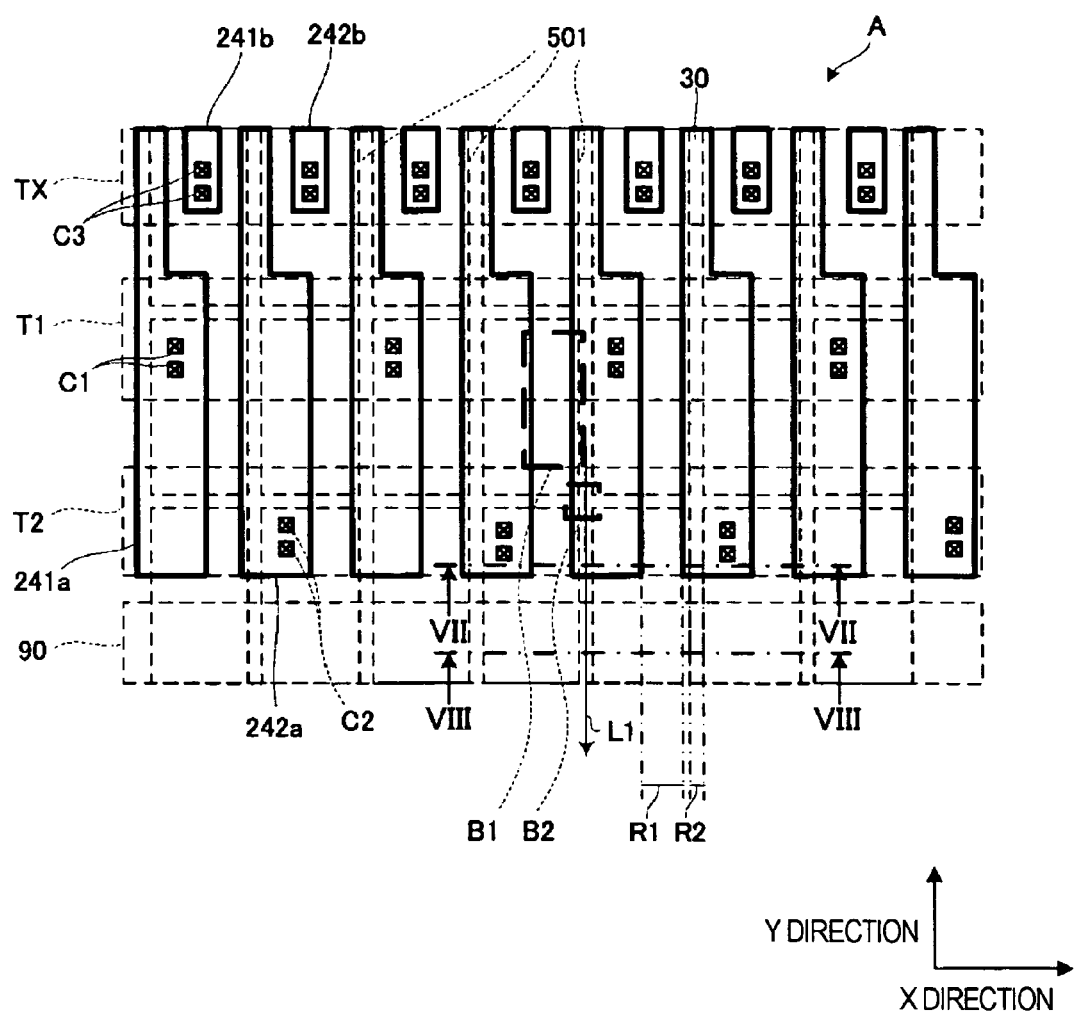
FIG. 5 is a plan view illustrating a second layer of a TFT array substrate 10.
Figure 6:
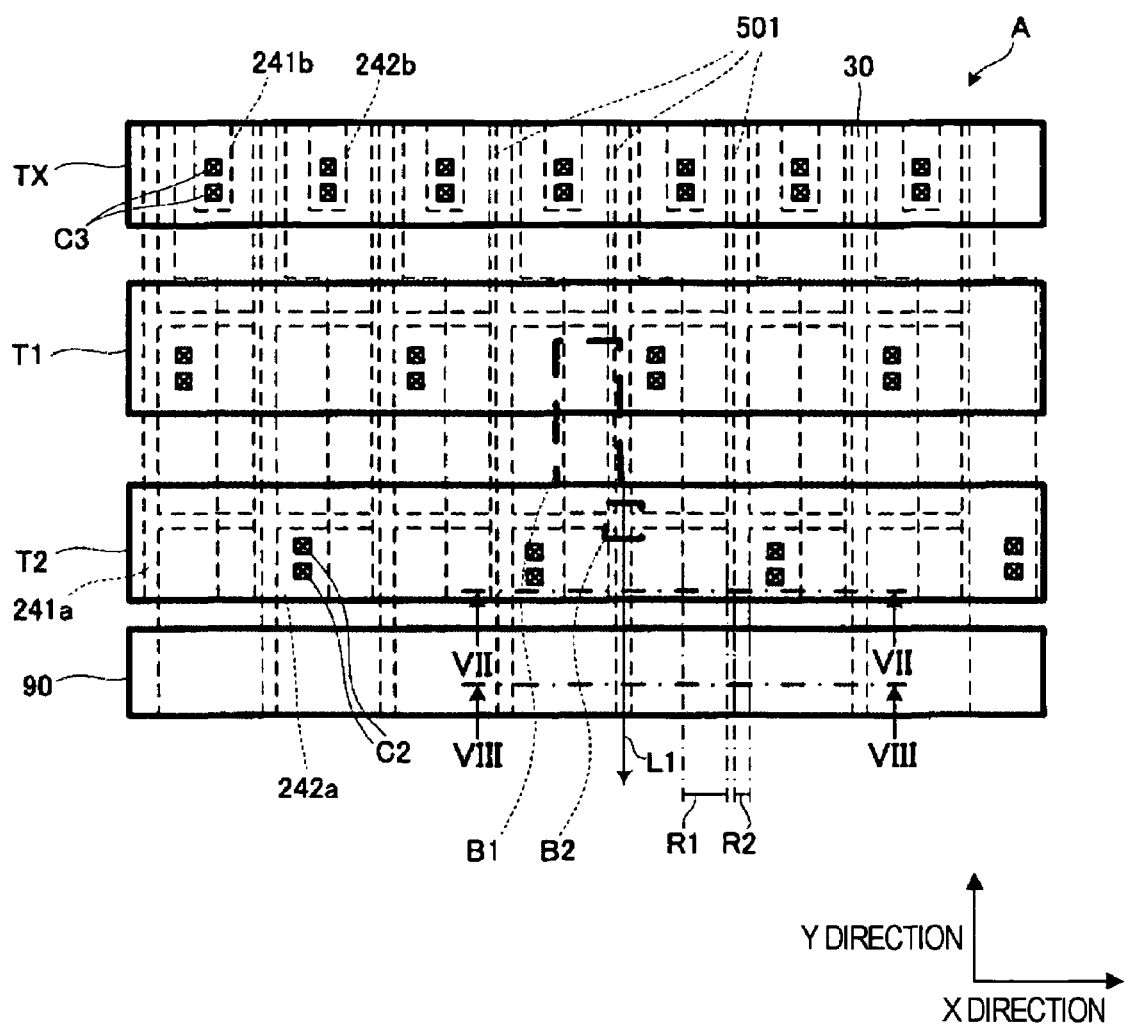
FIG. 6 is a plan view illustrating a third layer of a TFT array substrate 10.
Figure 7:
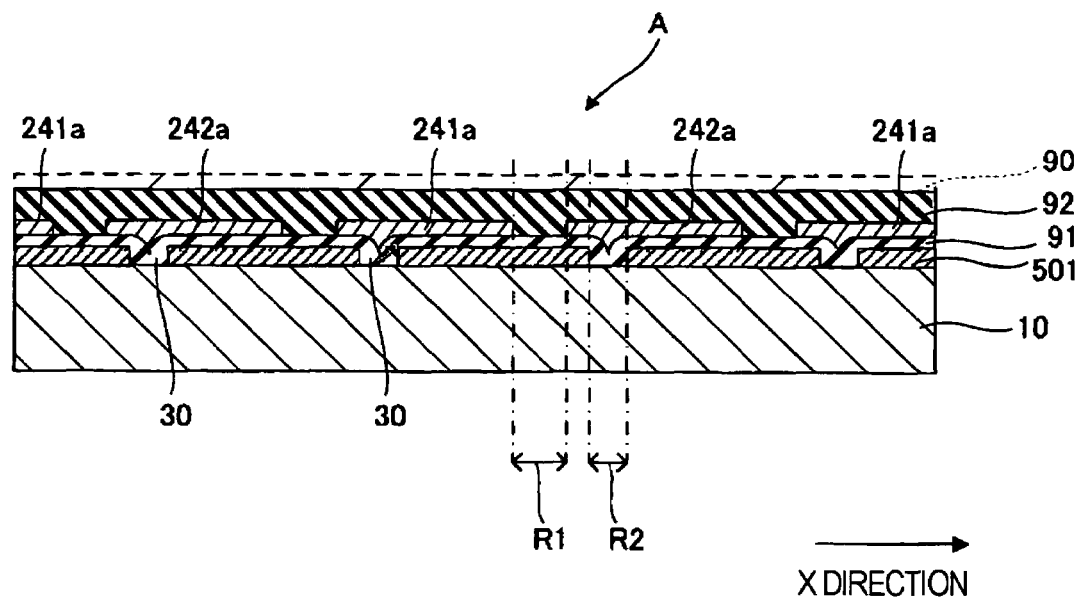
FIG. 7 is a cross-sectional view taken along the line VII-VII of FIGS. 4 to 6.
Figure 8:
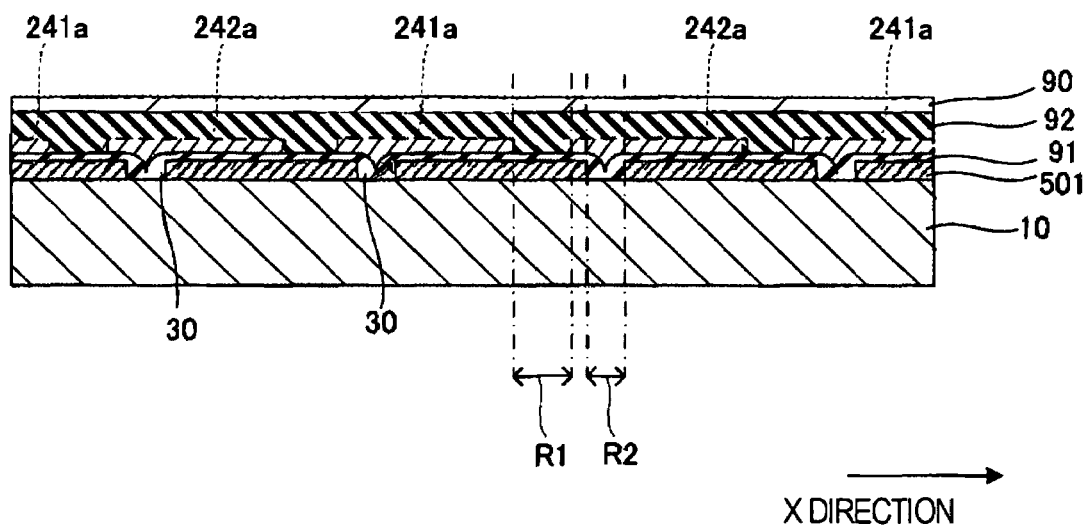
FIG. 8 is a cross-sectional view taken along the line VIII-VIII of FIGS. 4 to 6.

Next, main contents of the electro-optical device according to this embodiment will be described with reference to FIGS. 4 to 9. FIGS. 4 to 6 are plan views illustrating a wiring line structure in a region A of the peripheral regions where the test circuit 40 is provided. In FIGS. 4 to 6, respective essential elements are shown by thick solid lines and dotted lines so as to overlap one another. In FIGS. 4 to 6, portions that are provided at a lower layer side of the TFT array substrate 10 are shown by large characters. Specifically, in FIG. 4, a portion of a first layer of the TFT array substrate 10 is shown by solid lines. In FIGS. 5 and 6, portions that are provided on a second layer and a third layer on the first layer shown in FIG. 4 are shown by thick solid lines. FIG. 7 is a cross-sectional view taken along the lines VII-VII of FIGS. 4 to 6. FIG. 8 is a cross-sectional view taken along the lines VIII-VIII of FIGS. 4 to 6.

In FIGS. 4 to 6, the TFT array substrate 10 includes a plurality of lower light-shielding films 501, separation regions 30, insulating films 91 and 92, leading wiring lines 241a and 242a, power supply wiring lines 90, test enable wiring lines T1 and T2 as an example of a 'third conductive film' of the invention, test wiring lines TX, and contact holes C1, C2, and C3 as an example of a 'conductive film' of the invention.

In FIG. 4, each of the lower light-shielding films 501 is formed in a rectangular island shape in plan view in the peripheral regions that extend around the image display region 10a. The lower light-shielding films 501 are formed in a matrix in a direction (Y direction in the drawing) where the leading wiring lines 241a and 242a extend, and a direction (X direction) crossing the Y direction.

Further, it is easiest to form the lower light-shielding film 501 in a rectangular shape in designing, but the shape of the lower light-shielding film 501 is not limited to a complete rectangular shape. For example, the lower light-shielding film 501 may be formed in various shapes, such as an octagonal shape obtained by cutting corners of a rectangle, another shape obtained by cutting a rectangle so as for corners of the rectangle to be curved, and the like, if the shape is similar to the rectangular shape.

According to the lower light-shielding films 501 according to this embodiment, as compared with a case in which one lower light-shielding film is formed in the peripheral region, it is possible to alleviate stresses applied to an upper layer and a lower layer of the lower light-shielding film 501. As a result, the occurrence and propagation of the cracks can be reduced, which will be described in detail below. Further, if the regions separating the plurality of lower light-shielding films from one another are set to be narrow, exit light in the image display region 10a can be further reduced through the regions that extend in a matrix so as to separate the plurality of lower light-shielding films 501 from one another, and the occurrence and the propagation of the cracks can be reduced while maintaining the quality of the display image to the extent that the image quality does not affect the display image.

The lower light-shielding film 501 is formed of one kind of metallic film or a plurality of kinds of metallic films, and reduces bright and dark striped patterns that occur in the display images due to inner surface reflecting light reflected from the frame-shaped light-shielding film 53. The lower light-shielding film 501 is formed of a metallic film made of a light shielding metallic material, such as aluminum or chromium, or formed by laminating a plurality of metallic films. In the peripheral regions that extend around the image display region 10a, the lower light-shielding film 501 is directly formed on the TFT array substrate 10 or indirectly formed on the TFT array substrate 10 with a multilayered structure that forms a base insulating film or another circuit therebetween.

In FIG. 7, the separation regions 30 are provided in the separation regions R2 that extend along one side (along a Y direction in the drawing) of the lower light-shielding film 501 in regions that extend in a matrix so as to separate the plurality of lower light-shielding films 501 from one another. When an insulating film 91 for covering the plurality of lower light-shielding films 501 is formed, the separation regions 30 are formed by curing portions of insulating materials forming the insulating film 91 in the separation regions R2.

In FIG. 5, the leading wiring lines 241a and 242a are formed to extend along a Y direction on the insulating film 91, and disposed in an X direction, in plan view, such that the separation regions R1 do not overlap the separation region R2. Accordingly, the cracks occurring in the separation regions 30 at the time of manufacturing or operating the liquid crystal device 1 can be reduced from propagating to the separation regions R1 through the insulating film 91. Specifically, as compared to the lower light-shielding film 501 made of a metal, such as, for example, aluminum or chromium, and the leading wiring lines 241a and 242a formed of semiconductor films, it is possible to suppress the occurrence and propagation of the cracks occurring due to the overlapping of portions whose mechanical strength is lowered. Thereby, it is possible to reduce the multilayered structure formed on the lower light-shielding film 501 from being damaged due to the propagation of the cracks. In addition, the leading wiring lines 241a and 242a are disposed at pitches corresponding to pitches between a plurality of lower light-shielding films 501 in an X direction. Therefore, it is possible to reduce the stresses acting between the leading wiring lines 241a and 242a, and the plurality of lower light-shielding films 501.

The leading wiring lines 241a and 242a that are led from the gates of the test enable switches 241 and 242 are electrically connected to the test enable wiring lines T1 and T2 through the contact holes C1 and C2.

The leading wiring lines 241b and 242b that are led from the drains of the test enable switches 241 and 242 are disposed in an X direction in the drawing. The leading wiring lines 241b and 242b are electrically connected to the test wiring line TX through a contact hole C3, and the test signal is outputted to the test wiring line TX in accordance with the turning on or turning off of the test enable switches 241 and 242. Thereby, the test signal that is outputted from each pixel portion 70 is outputted to the test circuit that is provided in the peripheral region of the image display region 10*a* or outside the liquid crystal device 1.

In FIG. 6, the test wiring line TX, the test enable wiring lines T1 and T2, and the power supply wiring line 90 extend in an X direction.

In FIGS. 6 and 8, although the power supply wiring line 90 made of a metallic material, such as, for example, aluminum and the like, extends on the separation region 30, the separation regions R1 and R2 do not overlap each other in plan view. Accordingly, it is possible to reduce the cracks occurring in the separation regions 30 from propagating to the power supply wiring lines 90 to thereby cut the power supply wiring lines 90. Thereby, the driving power supply is reliably supplied to the TE circuit 210, the Y-driver circuit 104, and the X-driver circuit 101 to which the driving power supply is supplied through the power supply wiring lines 90.

Figure 9A:
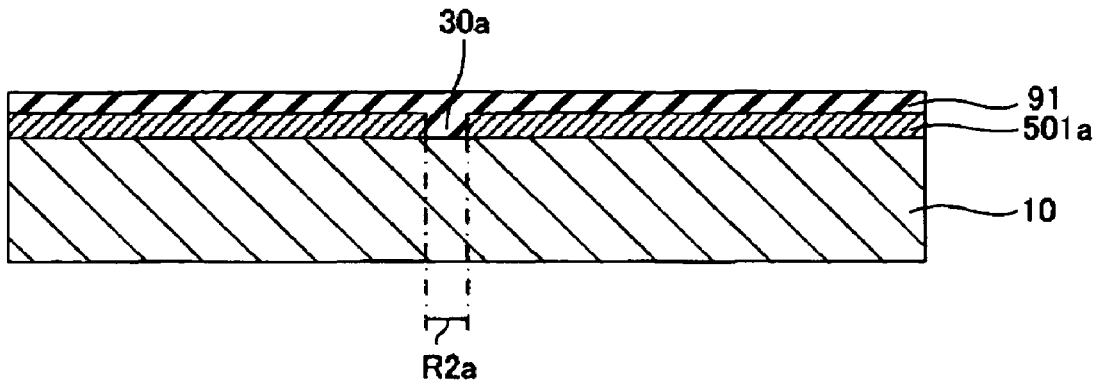
FIGS. 9A to 9C are comparative diagrams of the relationships between a width of a region where lower light-shielding films are separated from each other and cracks generated in a separation portion.
Figure 9B:
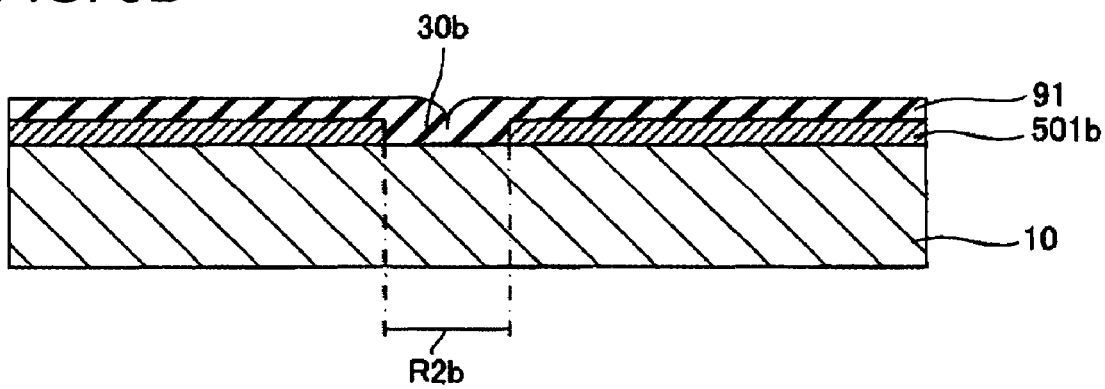
Figure 9C:
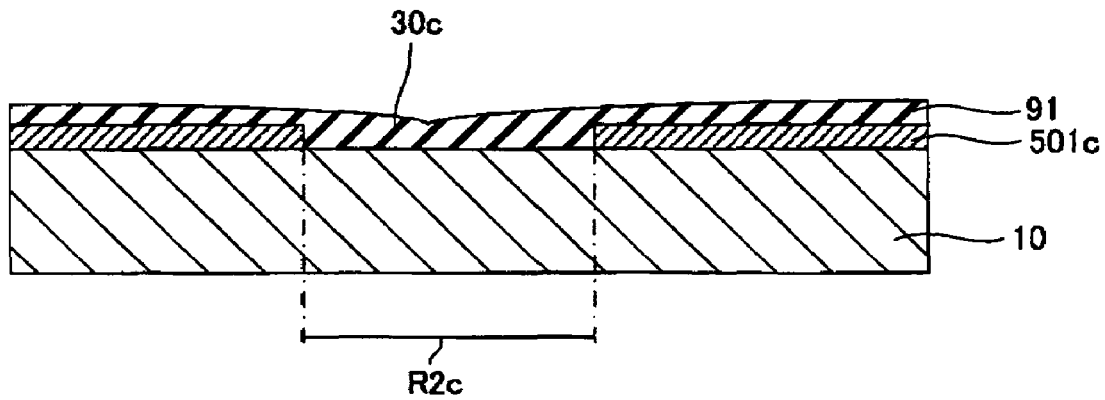

Next, a case in which the arrangement relationship between the separation regions R1 and R2 in this embodiment is very effective in reducing the cracks from propagating will be described. FIG. 9 is a diagram illustrating the compared results of a relationship between the width of a region separating the lower light-shielding films and the crack occurring in the separation region 30. FIGS. 9A to 9C are diagrams corresponding to the cross-sectional view of FIG. 8. Further, it should be understood that the relationship between the separation regions R2*a*, R2*b*, and R2*c* (which will be described in detail below), and the cracks occurring in the separation regions is exemplary, and the widths of the separation regions where the cracks may easily occur are different according to the shape, width, and thickness of the lower light-shielding film, the thickness of the insulating film covering the lower light-shielding film, the insulating material forming the insulating film, and the curing conditions.

In FIG. 9A, when the width of the separation region R2*a* is less than 1 μm, the insulating materials are uniformly contained in the separation region, and the top surface of the separation region 30*a* is flat. Accordingly, a hollow as one factor that causes the cracks to occur is not formed in the separation portion.

In FIG. 9C, when the width of the separation region R2*c* is not less than 6 μm, the top surface of the separation region 30*c* has moderate inclination to the extent that the cracks do not occur. As a result, it is difficult for the cracks to occur in the separation region 30*c*.

In FIG. 9B, when the width of the separation region R2*b* is within a range of 3 to 5 μm, a hollow may easily occur on the top surface of the separation region 30*b* from the experimental or logical viewpoint. Therefore, in this embodiment, when the width of the separation region R2 is within a range of 3 to 5 μm, it is possible to effectively reduce the occurrence and propagation of the cracks.

As described above, according to the liquid crystal device 1 according to this embodiment, the occurrence and propagation of the cracks can be reduced. For example, it is possible to reduce the power supply wiring line 90 formed on the test enable wiring lines T1 and T2 from being cut due to the propagation of the cracks. Thereby, it is possible to reduce the defects occurring at the time of manufacturing or operating the liquid crystal device 1. As a result, a yield and reliability can be improved.

Modification

Next, a modification of the above-mentioned liquid crystal device 1 will be described with reference to FIG. 10. According to the leading wiring lines included in the liquid crystal device of this example, the occurrence of the cracks in the region B1 shown in FIGS. 4 to 6, and the cracks propagating to the power supply wiring lines 90 through the regions B1 and B2 can be further effectively reduced. In the description below, the same constituent elements as those in the liquid crystal device 1 are denoted by the same reference numerals, and the detailed description thereof will be omitted. FIG. 10 is a plan view illustrating a portion of a first layer of the TFT array substrate 10 that corresponds to FIG. 4.

In FIG. 10, since the separation regions 30 do not overlap the separation regions R1*a* and R2 separating the leading wiring lines 241*c* and 242*c*, the propagation of the cracks occurring in the separation region 30 can be reduced, similar to the above-mentioned liquid crystal device 1.

In addition, planar shapes of the leading wiring lines 241*c* and 242*c* that are electrically connected to the gates of the test enable switches 241 and 242 are symmetrical in an X direction on the basis of the center lines CL1 and CL2 of the separation region R2 of the lower light-shielding film 501.

According to the leading wiring lines 241*c* and 242*c*, for example, when the leading wiring lines 241*c* and 242*c* are formed on the insulating film 91 by means of a thin film forming method, such as a deposition method or a sputtering method, stress applied from the wiring lines to the insulating film 91 can be reduced, and thus stress that are indirectly applied to the separation regions 30 can be reduced. Accordingly, the cracks occurring in the separation regions 30 can be reduced, and it can be effectively prevented that the cracks easily propagate due to the stresses applied to the lower layer side of the leading wiring lines 241*c* and 242*c*. Specifically, it is possible to reduce the cracks from propagating to the power supply wiring line 90 through the regions B1 and B2 shown in FIGS. 4 to 6.

The leading wiring lines 241*c* and 242*c* are formed so as to have different lengths along the Y direction in the drawing. The leading wiring lines 241*c* and 242*c* are electrically connected to the test enable wiring lines T1 and T2 disposed to be shifted from each other in a Y direction in the drawing through the contact holes C1*a* and C2*a*. Accordingly, according to the leading wiring lines 241*c* and 242*c*, the leading wiring lines 241*c* and 242*c* can be electrically connected to the test enable wiring lines T1 and T2 formed on the same layer while forming leading wiring lines 241*c* and 242*c* on the separation region R2. Thereby, the leading wiring lines 241*c* and 242*c* can be electrically connected to the test enable wiring lines T1 and T2 without forming the multilayered structure formed on the TFT array substrate 10 with a complicated layer structure.

Electronic Apparatus

Figure 11:
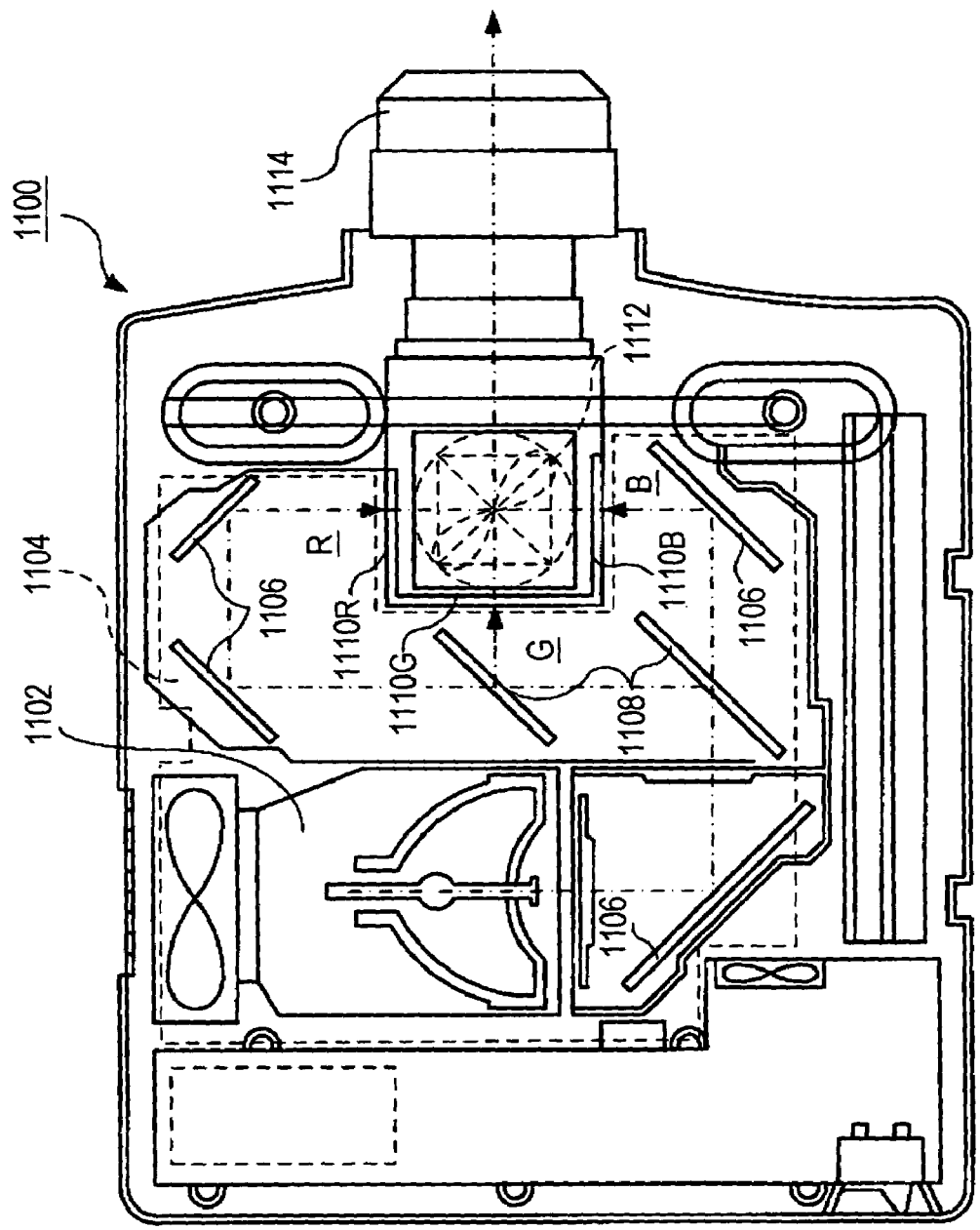
FIG. 11 is a plan view illustrating a structure of a projector that is an example of an electronic apparatus to which an electro-optical device is applied.
Figure 12:
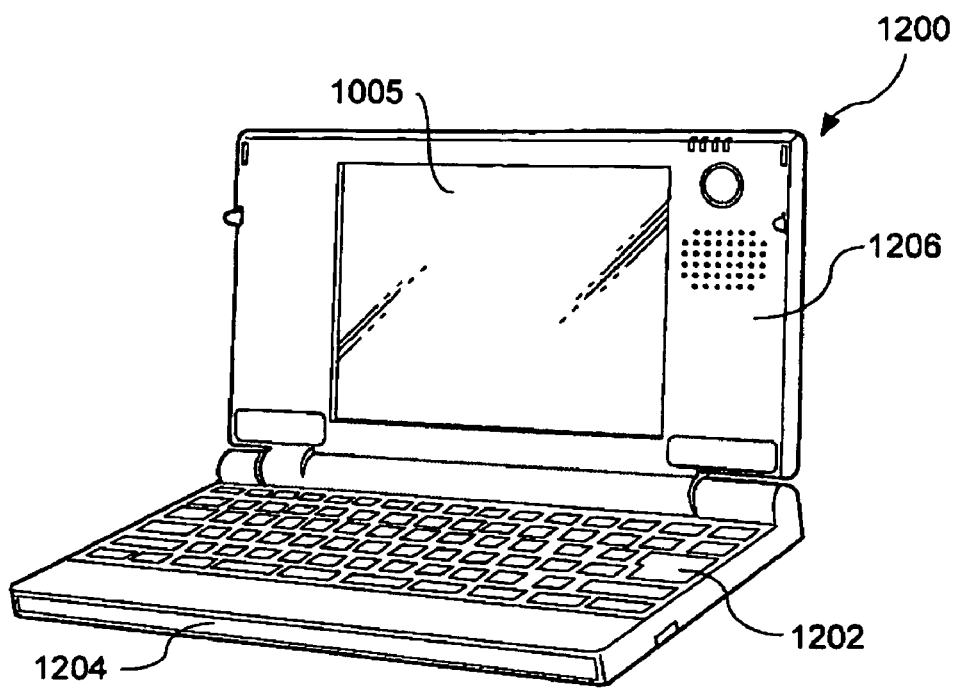
FIG. 12 is a perspective view illustrating a structure of a personal computer that is another example of an electronic apparatus to which an electro-optical device is applied.
Figure 13:
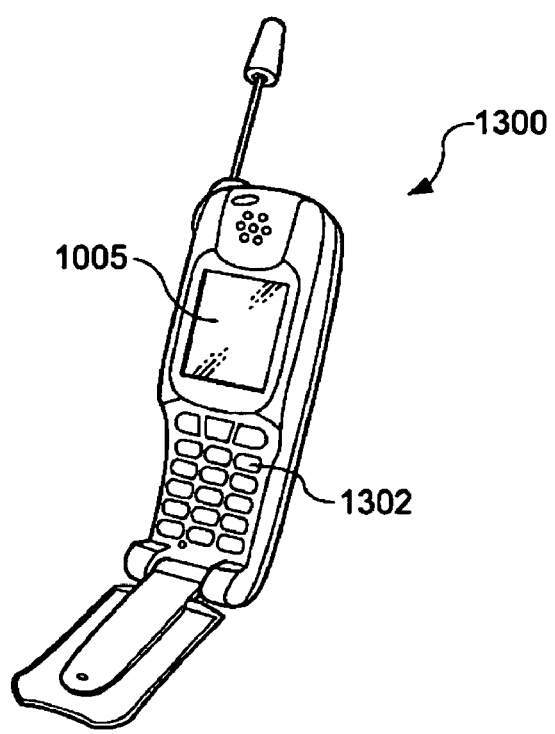
FIG. 13 is a perspective view illustrating a structure of a cellular phone that is another example of an electronic apparatus to which an electro-optical device is applied.

Next, examples in which the above-mentioned liquid crystal device is applied to various electronic apparatuses will be described with reference to FIGS. 11 to 13.

First, a projector in which the liquid crystal device is used as a light valve will be described. FIG. 11 is a plan view illustrating an example of a structure of a projector. As shown in FIG. 11, in a projector 1100, a lamp unit 1102 that is composed of a white light source, such as a halogen lamp, is provided. Light emitted from the lamp unit 1102 is separated into light of three primary colors for R, G, and B by means of four mirrors 1106 and two dichroic mirrors 1108 that are disposed in a light guide 1104, and then incident on liquid crystal panels 1110R, 1110B, and 1110G serving as light valves that correspond to the respective three primary colors.

Each of the liquid crystal panels 1110R, 1110B, and 1110G has the same structure as the above-mentioned liquid crystal device. The liquid crystal panels 1110R, 1110B, and 1110G are respectively driven by three primary color signals for R, G, and B supplied from an image signal processing circuit. In addition, the light that is modulated by these liquid crystal panels is incident on a dichroic prism 1112 in three directions. In the dichroic prism 1112, the light of R and B is refracted at 90 degrees, and the light of G propagates straightly. Accordingly, images of the respective colors are synthesized. As a result, color images are projected onto a screen and the like through a projection lens 1114.

In this case, focusing on display images by the liquid crystal panels 1110R, 1110B, and 1110G, the display image by the liquid crystal panel 1110G needs to be inverted in a horizontal direction with respect to the display images by the liquid crystal panels 1110R and 1110B.

Further, on the liquid crystal panels 1110R, 1110B, and 1110G, the light corresponding to the respective primary colors including R, G, and B is incident by means of the dichroic mirror 1108. Therefore, a color filter does not need to be provided.

Next, an example in which the above-mentioned liquid crystal device is applied to a mobile personal computer will be described. FIG. 12 is a perspective view illustrating a structure of a personal computer. In FIG. 12, a computer 1200 includes a main body portion 1204 having a keyboard 1202, and a liquid crystal display unit 1206. The liquid crystal display unit 1206 is constructed by additionally providing a backlight on a back surface of the above-mentioned liquid crystal device 15.

Further, an example in which the above-mentioned liquid crystal device is applied to a cellular phone will be described. FIG. 13 is a perspective view illustrating a structure of the cellular phone. In FIG. 13, a cellular phone 1300 includes a plurality of operation buttons 1302, and a reflective liquid crystal device 15. A front light is provided on a front surface of the reflective liquid crystal device, if necessary.

Examples of the electronic apparatus may include a liquid crystal television, a view-finder-type or monitor-direct-view-type video tape recorder, a car navigation device, a pager, an electronic note, an electronic calculator, a word processor, a workstation, a video phone, a POS terminal, an apparatus having a touch panel, and the like, in addition to the electronic apparatuses described with reference to FIGS. 11 to 13. Further, it is needless to say that the above-mentioned liquid crystal device is applied to the various electronic apparatuses.

The invention is not limited to the above-mentioned embodiments. That is, various changes and modifications can be made without departing from the spirit and scope of the invention that is readable from the appended claims and the entire specification. An electro-optical device where the modification and changes are made, and an electronic apparatus including the electro-optical device are also within a technical range of the invention.

What is claimed is:

1. An electro-optical device comprising:
   a substrate;
   a plurality of pixels that are formed in an image display region on the substrate;
   a plurality of light-shielding films that are formed as island shapes in a peripheral region outside of the image display region, the light-shielding films including:
      a pair of first direction light-shielding films that are adjacent to each other in a first direction and that are separated from each other in the first direction by a first direction separation region and
      a pair of second direction light-shielding films that are adjacent to each other in a second direction and that are separated from each other in the second direction by a second direction separation region;
   an insulating film that covers the plurality of light-shielding films and the first and second separation regions; and
   a plurality of first conductive films that are formed so as to extend in the first direction and disposed in the second direction, wherein one of the plurality of first conductive films overlaps the first separation region between the pair of first direction light-shielding films and overlaps the second separation region between the pair of second direction light-shielding films.

2. The electro-optical device according to claim 1, wherein each of the plurality of light-shielding films corresponds to a lower light-shielding film that is formed below a circuit provided in the peripheral region, and the electro-optical device further includes a plurality of second conductive films that are formed on the plurality of first conductive films, at least partially overlap the separation regions extending in the first direction in the regions between the lower light-shielding films, and extend in the second direction.

3. The electro-optical device according to claim 2, wherein the plurality of lower light-shielding films are disposed in a matrix in the peripheral region, and the plurality of first conductive films are disposed at predetermined intervals corresponding to intervals between the plurality of lower light-shielding films in the second direction.

4. The electro-optical device according to claim 1, wherein planar shapes of the first conductive films are symmetrical on the basis of the separation regions in the second direction.

5. The electro-optical device according to claim 1, further comprising: a plurality of third conductive films that are formed on different layers from the plurality of first conductive films, that extend in the second direction, and that are disposed in the first direction, wherein lengths of one first conductive film and another first conductive film adjacent to each other among the plurality of first conductive films are different from each other in the first direction, the one first conductive film is electrically connected to one of the plurality of third conductive films through one conductive portion that extends in a direction crossing a surface of the substrate, and another first conductive film is electrically connected to one of the plurality of third conductive films through another conductive portion that extends in the direction crossing the surface of the substrate.

6. The electro-optical device according to claim 5, further comprising: a plurality of transistors that are electrically connected to the plurality of pixels, each of which has a pixel electrode, wherein the one first conductive film is electrically connected to a gate of one transistor among adjacent transistors in the first direction in the plurality of transistors, and another first conductive film is electrically connected to a gate of another transistor among the adjacent transistors.

7. The electro-optical device according to claim 1, further comprising: a counter substrate that is opposite to the substrate and bonded to the substrate by a sealant provided in an outside region of a frame region defining the image display region in the peripheral regions, wherein the counter substrate has upper light-shielding films that are formed in the frame region at a counter surface side opposite to the substrate surface, and the lower light-shielding films are formed in at least the outside region of the peripheral region.

8. An electronic apparatus comprising the electro-optical device according to claim 1.

9. The electro-optical device according to claim 1, one of the pair of first direction light-shielding films being included in the pair of second direction light-shielding films.

10. The electro-optical device according to claim 1, neither of the pair of first direction light-shielding films being included in the pair of second direction light-shielding films.

11. An electro-optical device comprising:

a substrate;

a plurality of pixels formed in an image display region on the substrate;

light-shielding films located in a peripheral region to the outside of the image display region, the light-shielding films having island shapes;

an insulating film that covers the plurality of light-shielding films; and conductive films that extend in a first direction and that are juxtaposed in a second direction that crosses the first direction, the conductive films including a pair of adjacent conductive films that are separated from each other in the second direction by a separation region, one of the light-shielding films overlapping the pair of adjacent conductive films and the separation region between the pair of adjacent conductive films.

* * * * *